United States Patent [19]

Freeman

[11] 4,361,378

[45] Nov. 30, 1982

[54] BIOCULAR VIEWING APPARATUS

[75] Inventor: Michael H. Freeman, Clwyd, Wales

[73] Assignee: Pilkington P.E. Limited, Lancashire, England

[21] Appl. No.: 898,463

[22] Filed: Apr. 21, 1978

[30] Foreign Application Priority Data

Apr. 27, 1977 [GB] United Kingdom ............... 17589/77

[51] Int. Cl.³ ....................... G02B 23/12; G02B 23/02
[52] U.S. Cl. ......................................... 350/36; 350/48
[58] Field of Search ....................... 350/36, 37, 48, 52, 350/54, 145, 301, 35, 55, 137

[56] References Cited

U.S. PATENT DOCUMENTS

| | | | |
|---|---|---|---|
| 3,464,757 | 9/1969 | Schmidt et al. | 350/52 |
| 3,549,231 | 12/1970 | Scidmore et al. | 350/52 |
| 3,964,818 | 6/1976 | Humphrey | 350/36 |

FOREIGN PATENT DOCUMENTS

| | | | |
|---|---|---|---|
| 717741 | 9/1965 | Canada | 350/52 |
| 1149238 | 4/1969 | United Kingdom . | |
| 1152019 | 5/1969 | United Kingdom . | |
| 1208592 | 10/1970 | United Kingdom . | |

Primary Examiner—S. C. Buczinski
Attorney, Agent, or Firm—Schuyler, Banner, Birch, McKie & Beckett

[57] ABSTRACT

A system for biocular viewing of a distant scene or object especially under daylight conditions comprises an objective lens which produces an initial image, one or two relay lenses with associated reflectors which produce from that initial image a pair of tilted images, and a biocular magnifying eyepiece lens through which an observer views so that each eye receives light from a respective one of the tilted images. The system can be incorporated in a combined day and night viewing system employing common objective lens and eyepiece lens components for the day and night viewing paths.

19 Claims, 4 Drawing Figures

BIOCULAR VIEWING APPARATUS

BACKGROUND OF THE INVENTION

This invention concerns improvements in or relating to optical apparatus and relates more particularly to optical apparatus for biocular viewing of a magnified image of a distant scene or object especially under daylight conditions.

There have been previous proposals for biocular magnifying lenses through which an observer can view simultaneously with both eyes a magnified image of an object. These have been proposed, in particular, for low light level or night vision devices in which the viewed object is located close to the lens and takes the form, for example, of a cathode ray tube or the phosphor of an image intensifier. It has been found that one problem with such lenses is that generally only a small fraction of the light travels to the observer's pupils because of his spaced eye positions, the cones of rays generating such used light being at a considerable angle to the optical axis. It has further been found that, for this reason, such biocular magnifying lenses are not generally immediately applicable to the daylight viewing of distant scenes or objects by simply associating them with an objective lens because the aerial image formed by an objective lens usually has only a relatively narrow cone of light which tends to pass between the eyes, rather than entering them, of an observer attempting to view the image through such a biocular magnifying eyepiece lens.

SUMMARY

According to the present invention there is provided optical apparatus for biocular viewing having an optical axis comprising an objective lens for receiving light from a distant scene or object and producing an initial image thereof in an image plane, a biocular magnifying eyepiece lens having an object plane, relay lens means disposed between said image plane and said object plane, first reflector means associated with said relay lens means so that light from said initial image travels via the relay lens means and said first reflector means to form substantially in said object plane a first image tilted with respect to the optical axis, and second reflector means associated with said relay lens means so that light from said initial image travels via the relay lens means and said second reflector means to form substantially in said object plane a second image tilted with respect to the optical axis in a sense or direction of tilt opposite to that of said first image. Said first and second images tilted with respect to the optical axis may in practice be curved images resulting from the characteristics of the lenses employed.

With such apparatus one eye of a two-eyed observer looking into the eyepiece lens can receive light transmitted therethrough from the first tilted image while the other eye receives light transmitted through the eyepiece lens from the second tilted image, whereby the observer can see simultaneously with both eyes a magnified image of the distant scene or object.

Said first reflector means preferably comprises a pair of reflecting faces, for example provided by plane mirrors, and said second reflector means preferably similarly comprises a pair of reflecting faces, for example provided by plane mirrors.

In one embodiment in accordance with the invention said relay lens means consists of a single relay lens, and said first and second reflector means each comprise one reflecting face disposed in the light path between said image plane and the relay lens and another reflecting face disposed in the light path between the relay lens and said object plane.

From this aspect, the invention further provides optical apparatus for biocular viewing having an optical axis comprising an objective lens for receiving light from a distant scene or object and producing an initial image thereof in an image plane, a biocular magnifying eyepiece lens having an object plane, a relay lens, first and second pairs of reflecting faces positioned at off-axis locations one between said image plane and the relay lens and the other between the relay lens and said object plane, wherein the reflecting faces between the image plane and the relay lens reflect light from the initial image produced by the objective lens to produce a pair of off-axis virtual objects for the relay lens, and wherein the reflecting faces between the relay lens and said object plane are in tilted disposition with respect to the optical axis so as to produce from the light transmitted through the relay lens from said respective virtual objects a pair of images tilted in opposite senses or directions with respect to the optical axis and substantially in the object plane of the eyepiece lens.

In another embodiment in accordance with the invention said relay lens means consists of two relay lenses, and each of said first and second reflector means comprises a pair of reflecting faces located in the light path between a respective relay lens and said object plane.

According to this aspect, the invention further provides optical apparatus for biocular viewing having an optical axis comprising an objective lens for receiving light from a distant scene or object and producing an initial image thereof in an image plane, a biocular magnifying eyepiece lens having an object plane, a first relay lens located at an off-axis position between said image plane and said object plane and to one side of a plane containing the optical axis, a first pair of reflecting faces associated with said first relay lens and located at an off-axis position to said one side of said plane containing the optical axis and in relatively tilted disposition such that light from said initial image transmitted through said first relay lens and reflected from said first pair of reflecting faces forms substantially in said object plane a first image tilted with respect to the optical axis, a second relay lens located at an off-axis position between said image plane and said object plane and to the other side of said plane containing the optical axis, and a second pair of reflecting faces associated with said second relay lens and located at an off-axis position to said other side of said plane containing the optical axis and in relatively tilted disposition such that light from said initial image transmitted through said second relay lens and reflected from said second pair of reflecting faces forms substantially in said object plane a second image tilted with respect to the optical axis in a sense or direction of tilt opposite to that of said first image. An observer viewing through the eyepiece lens (with one eye to one side and the other eye to the other side of said plane containing the optical axis) can then effectively see one of said tilted images with one eye and the other with the other eye.

Apparatus in accordance with the invention may, if desired, include a field lens located substantially in said image plane of the objective lens. Further, if desired, the optical axis may be folded for example by the provision of a reflector, such as a mirror, located in the light path between the objective lens and its image plane, and/or in the light path between said first and second reflector means and said object plane of the eyepiece lens. Where a fold in the optical axis is provided at a position between the objective lens and its image plane, there are preferably provided two reflectors disposed to reflect light in directions towards the respective light paths via said first reflector means and said second reflector means. Thus, with the embodiment first mentioned above one of the reflectors may be disposed to reflect generally towards one of the reflecting faces between said image plane and the relay lens while the other reflector is disposed to reflect light generally towards the other of the reflecting faces between said image plane and the relay lens. With the other embodiment mentioned above one of the reflectors may be disposed to reflect light generally towards said first relay lens while the other reflector is disposed to reflect light generally towards said second relay lens.

Apparatus as set forth above, which is especially suitable for daylight viewing, may be incorporated in a combined day and night viewing system which may advantageously use common objective lens and/or eyepiece lens components for both viewing paths, and the invention further provides such a system incorporating apparatus as set forth above. In such a system there may be provided beam-splitter means associated with the biocular magnifying eyepiece lens and having a partially reflecting/partially transmitting interface which can reflect light in one of the viewing paths (e.g. from the phosphor of an image intensifier in the night vision path) towards an observer viewing through the eyepiece lens, and through which light in the other viewing path (e.g. the day viewing path) can be transmitted to the observer viewing through the eyepiece lens. Preferably, with such an arrangement, the beam-splitter means is located between a back part of the eyepiece lens through which the observer views for both paths, and separate effective front parts of the lens which can be designed to suit the particular respective optical requirements (e.g. different aberration control) of the two paths. At the entrance end of a combined system there may be an objective lens component through which light travels to both viewing paths and respective light directing means, such as mirrors, adapted to direct light transmitted through the objective lens component into the different day and night viewing paths. Preferably separate field lenses are provided in the two paths to suit the particular respective optical requirements (e.g. different aberration control). Thus, for example, the objective lens component may be backed by one mirror which reflects light transmitted through the objective lens component towards a field lens disposed at the entrance to an image intensifier tube in the night vision path, and by a further pair of mirrors which reflect light transmitted through the objective lens component towards another field lens disposed substantially in said image plane of the objective lens in the day vision path.

BRIEF DESCRIPTION OF THE DRAWINGS

Apparatus in accordance with the invention will now be described, by way of example, with reference to the accompanying drawings in which.

DESCRIPTION OF THE PREFERRED EMBODIMENTS

Figure 1:
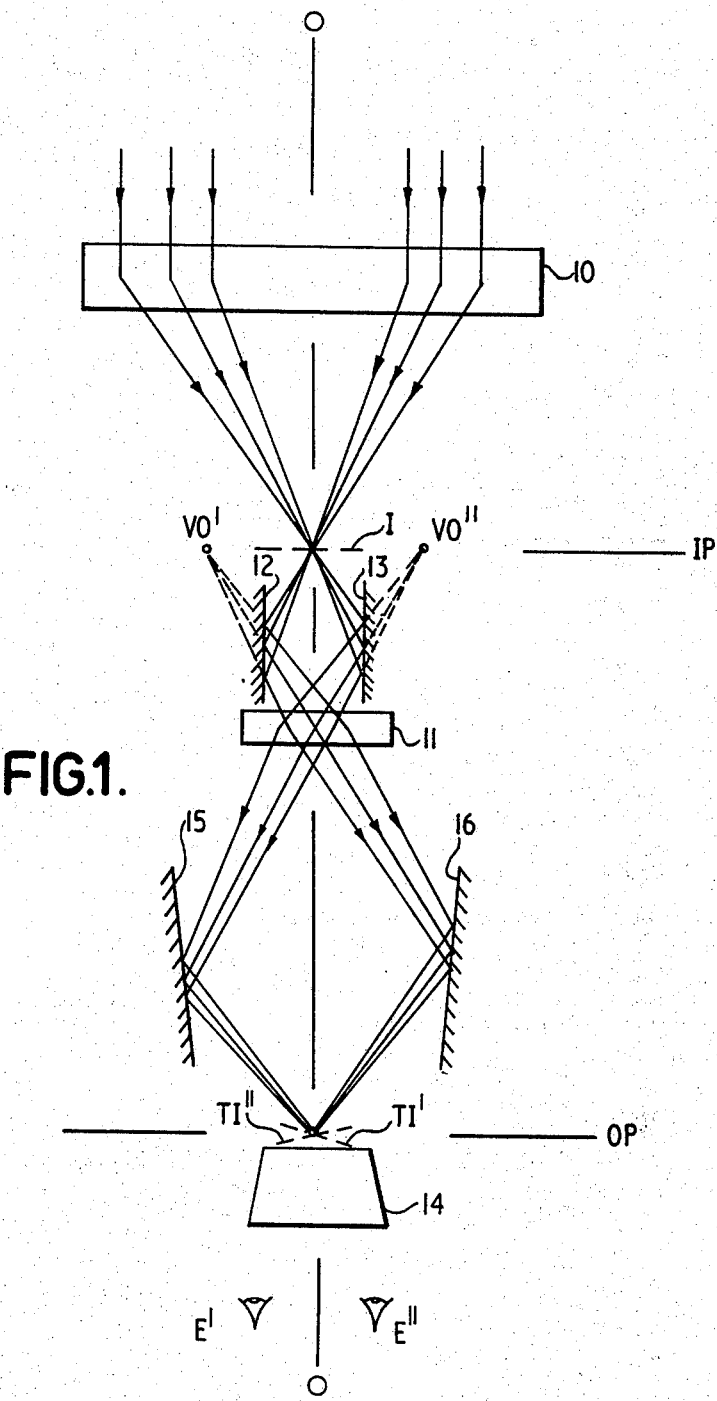
FIG. 1 is a schematic representation of a first embodiment.

The embodiment shown in FIG. 1 has an optical axis 0 on which an objective lens 10 is located. The objective lens 10 receives light from a distant scene or object and produces an initial image I thereof in an image plane IP.

A relay lens 11 is located on the optical axis 0 at a position spaced from the image plane IP, and plane mirrors 12 and 13 are positioned between the image plane IP and the relay lens 11. The mirrors 12 and 13 lie parrallel to each other and to the optical axis 0 and are symmetrically disposed at positions on opposite sides of a plane containing the optical axis 0 (i.e. a plane orthogonal to the plane of the drawing) at equal distances therefrom. The mirror 12 reflects light from the image I towards the relay lens 11 and thereby effectively provides for the relay lens a first off-axis virtual object VO' in the image plane IP. The mirror 13 similarly reflects light from the image I towards the relay lens 11 and thereby effectively provides for the relay lens a second off-axis virtual object VO" in the image plane IP.

A biocular magnifying eyepiece lens 14 is located on the optical axis 0 at a position spaced from the relay lens 11, the eyepiece lens 14 having an object plane OP. Plane mirrors 15 and 16 are positioned between the relay lens 11 and the object plane OP, these mirrors being symmetrically disposed at positions on opposite sides of the plane containing the optical axis 0 (and orthogonal to the plane of the drawing) and being slightly tilted with respect to the optical axis so that they converge in a direction towards the eyepiece lens 14. Light reflected from the mirror 12 (i.e. effectively coming from the first virtual object VO') and transmitted through the relay lens 11 is reflected by the mirror 16 to produce (due to the focussing action of the relay lens) a first image TI' substantially in the object plane OP but tilted with respect to the optical axis 0. Similarly light reflected from the mirror 13 (i.e. effectively coming from the second virtual object VO") and transmitted through the relay lens 11 is reflected by the mirror 15 to produce a second image TI" substantially in the object plane OP but tilted (in the opposite sense to the first tilted image TI') with respect to the optical axis 0.

It will thus be seen that the mirrors 12 and 16 provide first reflector means, in the form of a first pair of reflecting faces, associated with the relay lens 11 so that light from the initial image I produced by the objective lens 10 travels via the relay lens and such first reflector means to form a first tilted image TI' substantially in the object plane OP of the eyepiece lens 14, while the mirrors 13 and 15 provide second reflector means, in the form of a second pair of reflecting faces, associated with the relay lens 11 so that light from the initial image I travels via the relay lens and such second reflector means to form a second tilted image TI" substantially in the object plane OP, the two images being tilted in opposite senses or directions.

An observer viewing through the biocular magnifying eyepiece lens 14 (with one eye to one side and the other eye to the other side of the plane containing the optical axis and orthogonal to the plane of the drawing) sees with one eye E' the first tilted image TI' and with the other eye E" the second tilted image TI", and thereby sees simultaneously with both eyes a magnified image of the distant scene or object.

It will be appreciated that the mirrors 12 and 13, shown as parallel in FIG. 1, need not necessarily be so, but could be inclined relatively to the optical axis.

Figure 2:
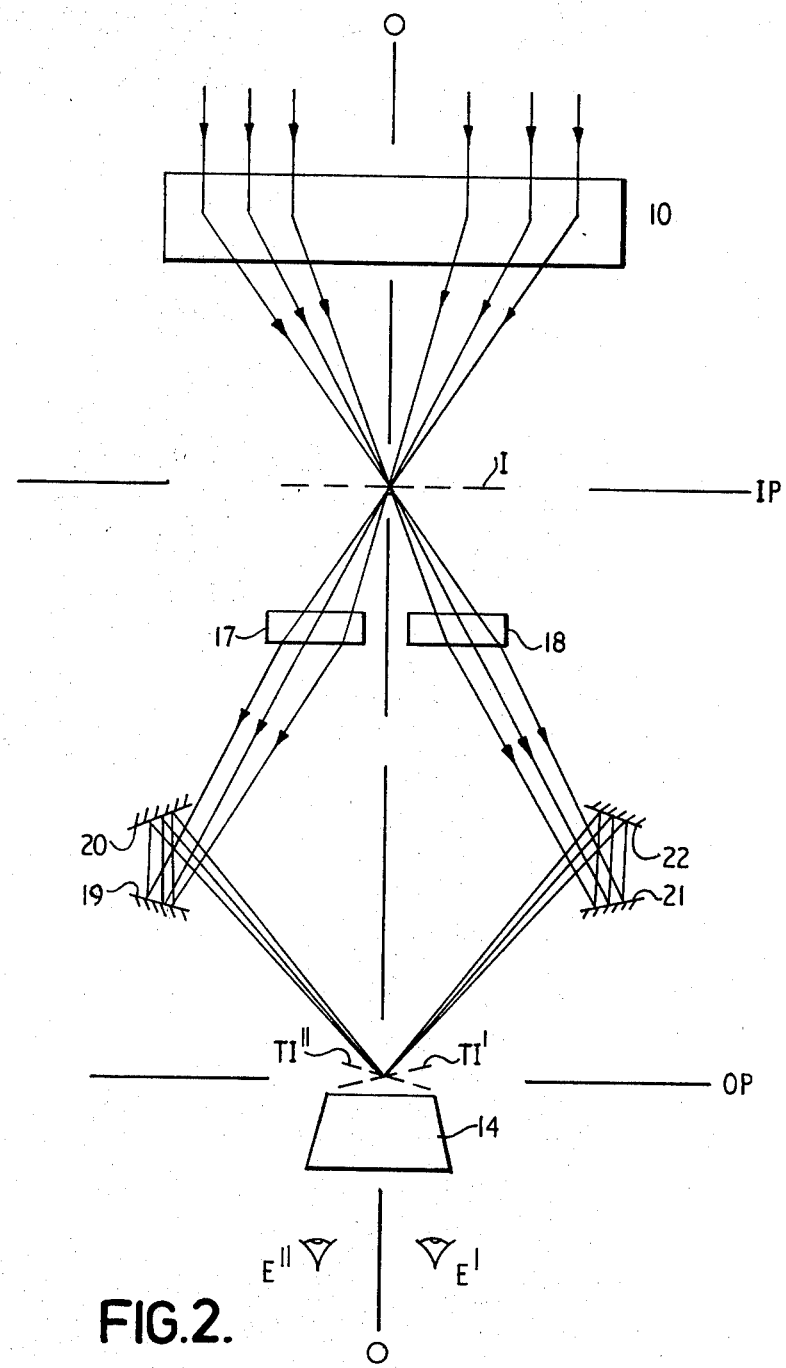
FIG. 2 is a schematic representation of a second embodiment.

The embodiment shown in FIG. 2, like that of FIG. 1, has an optical axis 0 on which is located an objective lens 10 which produces an initial image I of a distant scene or object in an image plane IP, and a biocular magnifying eyepiece lens 14 having an object plane OP. However, the arrangement of the relay lens means and the reflector means is different from that in the FIG. 1 embodiment.

In the FIG. 2 embodiment two relay lenses 17 and 18 are provided at symmetrical off-axis locations at equal distances from the image plane IP and equi-spaced on opposite sides of the plane containing the optical axis 0 and orthogonal to the plane of the drawing.

Associated with the relay lens 17 is first reflector means, in the form of a first pair of reflecting faces provided by plane mirrors 19 and 20, at an off-axis position between the relay lens 17 and the object plane OP of the eyepiece lens 14. The mirrors 19 and 20, which are located on the same side of the plane containing the optical axis 0 and orthogonal to the plane of the drawing as the relay lens 17, are tilted relatively to the optical axis and each other so that the mirror 19 faces generally towards the relay lens 17 and the mirror 20 faces generally towards the eyepiece lens 14. Light from the initial image I transmitted through the relay lens 17 is reflected from the mirror 19 to the mirror 20 from which it is then reflected to produce (due to the focussing action of the relay lens 17) a first tilted image TI' substantially in the object plane OP.

Associated with the relay lens 18 is second reflector means, in the form of a second pair of reflecting faces provided by plane mirrors 21 and 22, at an off-axis position between the relay lens 18 and the object plane OP of the eyepiece lens 14. The mirrors 21 and 22 are located opposite and symmetrically with respect to the mirrors 19 and 20, i.e. on the same side of the plane containing the optical axis 0 and orthogonal to the plane of the drawing as the relay lens 18, and are tilted relatively to the optical axis and each other so that the mirror 21 faces generally towards the relay lens 18 and the mirror 22 faces generally towards the eyepiece lens 14. Thus light from the initial image I transmitted through the relay lens 18 is reflected from the mirror 21 to the mirror 20 from which it is then reflected to produce (due to the focussing action of the relay lens 18) a second tilted image TI" substantially in the object plane OP, the sense or direction of tilt being opposite to that of the image TI'.

An observer viewing through the biocular magnifying eyepiece lens 14 (with one eye to one side and the other eye to the other side of the plane containing the optical axis and orthogonal to the plane of the drawing) can thus see with one eye E' the first tilted image TI' and with the other eye E" the second tilted image TI", and thereby sees simultaneously with both eyes a magnified image of the distant scene or object.

It will be appreciated that, by effectively splitting light from the initial image I formed by the objective lens 10 to produce two images TI' and TI" tilted in opposite senses to suit the two eye positions of an observer viewing through the biocular eyepiece lens 14, a high light utilisation can be achieved.

It will be understood that any suitable forms of lens may be employed for the objective lens, the relay lens or lenses, and the biocular magnifying eyepiece lens. By way of example only, the objective lens 10, which is preferably of fairly high aperture, may have an aperture of about F/0.9 and an angular field of view of about seven degrees, the relay lens 11 (FIG. 1) and the relay lenses 17 and 18 (FIG. 2) may have an aperture of about F/2 and an angular field of view of about 60 degrees, and the eyepiece lens 14 may have an aperture of about F/0.5 and an angular field of view of about 50 degrees.

If desired a field lens may be provided substantially in the image plane IP in both the FIG. 1 and FIG. 2 embodiments. Further, if desired, the optical axis 0 may be folded, for example by means of a mirror disposed between the objective lens 10 and its image plane IP and/or by means of a mirror disposed in the light path between the respective mirrors 15 and 16 (FIG. 1) or the mirrors 20 and 22 (FIG. 2) and the object plane OP of the eyepiece lens 14.

Figure 3:
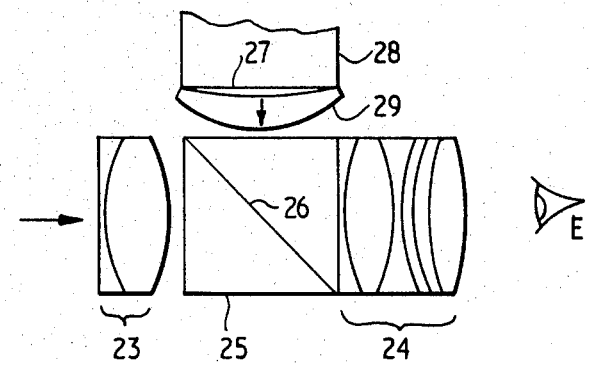
FIG. 3 is a schematic representation of part of a combined day and night biocular viewing system.

Apparatus as described above, which provides a day viewing system, can advantageously be combined with a low light level or night vision system using common biocular magnifying eyepiece lens components for both systems. An arrangement for achieving this is shown in FIG. 3.

A biocular magnifying eyepiece lens (equivalent to the lens 14) comprises a front part 23, which receives light from the tilted images TI' and TI" described above, and a back part 24 through which the observer views. Between the front and back parts is a beam-splitter block 25 having a partially reflecting interface 26 of suitable transmission/reflection characteristics. Above the block 25 is the phosphor 27 of an image intensifier tube 28, a suitable lens element 29 being disposed between the phosphor and the block. In the day vision mode of operation, light from the tilted images is transmitted through the front lens part 23, through the interface 26, and through the back lens part 24 to the eyes E of an observer, who thereby sees a magnified image of the distant scene or object under view. In the night vision mode of operation, light from the phosphor 27 travels via the lens element 29 to the interface 26 from which it is reflected to be transmitted through the back lens part 24 to the eyes E of the observer, who thereby sees a magnified image of the phosphor 27. It will be appreciated that the provision of different lens parts 23 and 29 in the respective day and night vision light paths permits different aberration corrections particularly suited to the optical characteristics of the two modes of operation to be effected. It will further be appreciated that the beam-splitter interface 26 can have wavelength selective characteristics such that it predominantly reflects light of a limited wavelength band emitted by the phosphor 27 and transmits light of other wavelengths.

Figure 4:
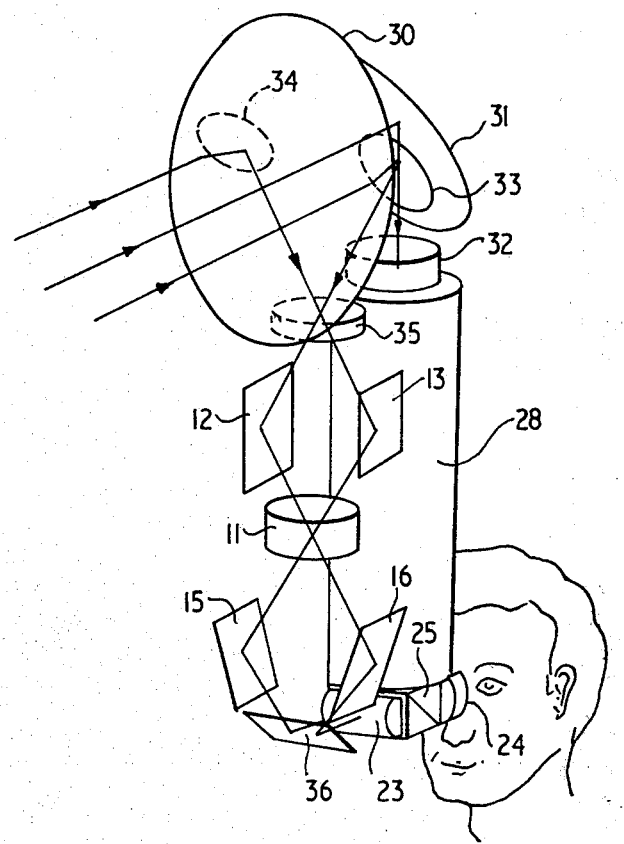
FIG. 4 is a schematic representation of a combined day and night biocular viewing system.

A combined day and night biocular viewing system is more fully shown in FIG. 4. This system incorporates apparatus essentially of the form shown in FIGS. 1 and 3 and the same reference numerals are used to indicate like parts.

The combined system comprises a folded objective lens (equivalent to lens 10 of FIG. 1) having a front lens component 30, which is common to both the day and night vision light paths. The component 30 is backed by an inclined mirror 31 which can reflect light to a field lens 32 mounted at the entrance to the image intensifier tube 28 in the night vision path, and is further backed by two smaller inclined mirrors 33 and 34 which can reflect light to a field lens 35 (disposed substantially in the image plane IP of FIG. 1) in the day vision path. The provision of different field lenses 32 and 35 in the night and day vision paths enables required different aberration control to be achieved.

In the night vision mode of operation, light from a distant scene or object transmitted through the objective lens component 30 and reflected by the mirror 31 enters the image intensifier tube 28 via the field lens 32 and an intensified image is produced on the phosphor 27 (FIG. 3) of the tube in well known manner. Such image is seen by the observer viewing through the back part 24 of the biocular magnifying eyepiece lens by reflection from the beam-splitter interface 26 as described above with reference to FIG. 3.

In the day vision mode of operation, light from a distant scene or object transmitted through the objective lens component 30 and reflected by the mirrors 33 and 34 to the field lens 35 is then reflected by mirrors 12 and 13 to relay lens 11 and then by mirrors 15 and 16 as described above with reference to FIG. 1. In the FIG. 4 arrangement the two mirrors 33 and 34 are so disposed that light reflected from the mirror 33 travels via the field lens 35 generally towards the mirror 12, and light reflected from the mirror 34 travels via the field lens 35 generally towards the mirror 13. Light reflected from the mirrors 15 and 16 strikes an inclined mirror 36 which reflects the light to the front part 23 (FIG. 3) of the biocular magnifying eyepiece lens. The observer viewing through the back part 24 of the eyepiece lens sees the produced tilted images by transmission through the beam-splitter interface 26 as previously described with reference to FIG. 3.

It will be appreciated that the combined day and night viewing system described above with reference to FIG. 4 as incorporating day vision apparatus essentially in the form of the FIG. 1 embodiment could instead incorporate day vision apparatus essentially in the form of the FIG. 2 embodiment, the light reflected from the mirrors 33 and 34 then being directed via the field lens 35 towards the respective relay lenses 17 and 18. In the FIG. 1 embodiment there is reverse stereopsis in the binocular overlap region since the right eye receives light from the left hand part of the objective lens while the left eye uses light from the right hand part. The FIG. 2 embodiment, in which the right eye receives light from the right hand part of the objective lens and the left eye from the left hand part, may therefore be preferable although the provision of two relay lenses inherently tends to increase the expense.

It will be understood that in the above described embodiments the tilted images TI' and TI'' may in practice be curved images, the curvature resulting from the optical characteristics of the objective lens 10 and/or the relay lenses 11 or 17 and 18 employed.

I claim:

1. Optical apparatus for biocular viewing having an optical axis comprising an objective lens for receiving light from a distant scene or object and producing an initial image thereof in an image plane, a biocular magnifying eyepiece lens having an object plane, relay lens means disposed between said image plane and said object plane, first reflector means associated with said relay lens means so that light from said initial image travels via the relay lens means and said first reflector means to form substantially in said object plane a first image tilted with respect to the optical axis, and second reflector means associated with said relay lens means so that light from said initial image travels via the relay lens means and said second reflector means to form substantially in said object plane a second image tilted with respect to the optical axis, each of said first and second reflector means comprising a pair of reflecting faces with said faces being tilted with respect to each other and at least one of said faces being tilted with respect to the optical axis so that said second image is tilted in a sense or direction of tilt opposite to that of said first image.

2. Apparatus according to claim 1 wherein said reflecting faces are provided by plane mirrors.

3. Apparatus according to claim 1 wherein said relay lens means consists of a single relay lens, and said first and second reflector means each comprise one reflecting face disposed in the light path between said image plane and the relay lens and another reflecting face disposed in the light path between the relay lens and said object plane.

4. Optical apparatus for biocular viewing having an optical axis comprising an objective lens for receiving light from a distant scene or object and producing an initial image thereof in an image plane, a biocular magnifying eyepiece lens having an object plane, a relay lens, a first pair of reflecting faces positioned at off-axis locations one between said image plane and the relay lens and the other between the relay lens and said object plane, and a second pair of reflecting faces positioned at off-axis locations one between the image plane and the relay lens and the other between the relay lens and said object plane, wherein the reflecting faces between the image plane and the relay lens reflect light from the initial image produced by the objective lens to produce a pair of off-axis virtual objects for the relay lens, and wherein the reflecting faces between the relay lens and said object plane are in tilted disposition with respect to the optical axis and with respect to each other so as to produce from the light transmitted through the relay lens from said respective virtual objects a pair of images tilted in opposite senses or directions with respect to the optical axis and substantially in the object plane of the eyepiece lens.

5. Apparatus according to claim 1 wherein said relay lens means consists of two relay lenses, and each of said first and second reflector means comprises a pair of reflecting faces located in the light path between a respective relay lens and said object plane.

6. Optical apparatus for biocular viewing having an optical axis comprising an objective lens for receiving light from a distant scene or object and producing an initial image thereof in an image plane, a biocular magnifying eyepiece lens having an object plane, a first relay lens located at an off-axis position between said image plane and said object plane and to one side of a plane containing the optical axis, a first pair of reflecting faces associated with said first relay lens and located at an off-axis position to said one side of said plane containing the optical axis and in relatively tilted disposition such that light from said initial image transmitted through said first relay lens and reflected from said first pair of reflecting faces forms substantially in said object plane a first image tilted with respect to the optical axis, a second relay lens located at an off-axis position between said image plane and said object plane and to the other side of said plane containing the optical axis, and a second pair of reflecting faces associated with said second relay lens and located at an off-axis position to said other side of said plane containing the optical axis and in relatively tilted disposition such that light from said initial image transmitted through said second relay lens and reflected from said second pair of reflecting faces forms substantially in said object plane a second image tilted with respect to the optical axis in a sense or direction of tilt opposite to that of said first image.

7. Apparatus according to claim 1 including a field lens located substantially in said image plane of the objective lens.

8. Apparatus according to claim 1 comprising folding means to fold the optical axis at at least one position.

9. Apparatus according to claim 8 wherein said folding means comprise at least one reflector located in the light path between the objective lens and its image plane.

10. Apparatus according to claim 8 wherein said folding means comprise a reflector located in the light path between said first and second reflector means and said object plane of the eyepiece lens.

11. Apparatus according to claim 8 wherein a fold in the optical axis is provided at a position between the objective lens and its image plane, comprising two reflectors disposed to reflect light in directions towards the respective light paths via said first reflector means and said second reflector means.

12. Apparatus according to claim 3 comprising two reflectors which provide a fold in the optical axis at a position between the objective lens and its image plane, wherein one of the reflectors is disposed to reflect light generally towards one of the reflecting faces between said image plane and the relay lens while the other reflector is disposed to reflect light generally towards the other of the reflecting faces between said image plane and the relay lens.

13. Apparatus according to claim 5 comprising two reflectors which provide a fold in the optical axis at a position between the objective lens and its image plane, wherein one of the reflectors is disposed to reflect light generally towards said first relay lens while the other reflector is disposed to reflect light generally towards said second relay lens.

14. A combined day and night viewing system incorporating apparatus according to claim 1 and having lens components common to respective day and night viewing paths.

15. A system according to claim 14 comprising beam-splitter means associated with the biocular magnifying eyepiece lens and having a partially reflecting/partially transmitting interface which can reflect light in one of the viewing paths towards an observer viewing through the eyepiece lens, and through which light in the other viewing path can be transmitted to the observer viewing through the eyepiece lens.

16. A system according to claim 15 wherein the beam-splitter means is located between a back part of the eyepiece lens through which the observer views for both the day and night viewing paths, and separate effective front parts of the lens designed to suit the particular respective optical requirements of the respective day and night viewing paths.

17. A system according to claim 14 having an objective lens component through which light travels to both viewing paths and comprising respective light directing means adapted to direct light transmitted through the objective lens component into the respective day and night viewing paths.

18. A system according to claim 14 wherein separate field lenses are provided in the day and night viewing paths to suit the particular respective optical requirements.

19. A system according to claim 17 wherein the objective lens component is backed by one mirror which reflects light transmitted through the objective lens component towards a field lens disposed at the entrance to an image intensifier tube in the night vision path, and by a further pair of mirrors which reflect light transmitted through the objective lens component towards another field lens disposed substantially in said image plane of the objective lens in the day vision path.

* * * * *